United States Patent [19]

Kice

[11] 4,232,632
[45] Nov. 11, 1980

[54] LIVE FOWL CONVEYING SYSTEM

[75] Inventor: Jack W. Kice, Wichita, Kans.

[73] Assignee: K-B Engineering Co., Wichita, Kans.

[21] Appl. No.: 729,380

[22] Filed: Oct. 4, 1976

Related U.S. Application Data

[63] Continuation of Ser. No. 645,527, Dec. 29, 1975, abandoned, which is a continuation of Ser. No. 70,011, Sep. 8, 1970, abandoned.

[51] Int. Cl.³ .............................................. A01K 29/00
[52] U.S. Cl. ...................................... 119/82; 406/169; 406/171
[58] Field of Search ..................... 302/2 R, 21, 40, 51, 302/52, 57, 58, 59, 62; 119/82; 406/163, 169, 171

[56] References Cited

U.S. PATENT DOCUMENTS

| | | | |
|---|---|---|---|
| 213,709 | 3/1879 | Taggart | 302/59 |
| 308,790 | 12/1884 | Munger | 302/62 |
| 824,585 | 6/1906 | Rieth et al. | 302/62 |
| 3,524,681 | 8/1970 | Boon | 302/59 |
| 3,568,643 | 3/1971 | Wessinger | 119/82 |

*Primary Examiner*—Jeffrey V. Nase
*Attorney, Agent, or Firm*—John H. Widdowson

[57] ABSTRACT

This invention is a conveying system for the transport of live fowl including a receiver assembly having an inlet thereto and outlet therefrom for live fowl and having an airlock assembly therebetween the inlet and outlet; a fowl conduit having an inlet thereto and outlet therefrom connected to the receiver assembly inlet; a suction apparatus mounted on the frame structure and connected to the receiver operable to provide a pressure drop between the fowl conduit inlet and the receiver assembly. More particularly, this invention is a system adapted to move live fowl through a fowl conduit, into a receiver assembly, through an airlock assembly and out of the receiver assembly.

18 Claims, 16 Drawing Figures

LIVE FOWL CONVEYING SYSTEM

This is a continuation of application Ser. No. 645,527, filed Dec. 29, 1975, now abandoned, which was a continuation of Ser. No. 70,011, filed Sept. 8, 1970 abandoned.

Previous methods of transporting live fowl known in the art involve hand selection and hand carrying to coops. These methods have been used in moving chickens from the chicken house, pen or like quarters to coops or trucks, or unloading the trucks. This often results in physical damage to the chicken. Chickens heretofore have been picked up one at a time held by one leg and carried in an inverted position to a coop, which has usually been placed on a truck or other vehicle, and deposited in the coop. Chickens are injured by this prior art method in a number of ways, usually by hanging inverted for a period of time as other chickens are picked up, being stuffed into the coop and sometimes being dropped.

The preferred specific embodiments described herein are depicted in conjunction with chickens; it is to be understood that use of this invention is not particularly limited to that type of live fowl. In one (1), preferred specific embodiment of this invention, the conveying system includes a frame mountable on a vehicle supporting a suction device and having a fowl conduit with an entryway thereto joining a receiver, airlock and discharge device powered by the suction device. In operation the entryway is preferably positioned at the source of fowl, for example either the chicken house or pen with the fowl conduit connected to the frame and the receiver. The receiver is preferably supported from a tower mounted with the frame at an above-ground level. The tower and length of fowl conduit mounted therewith is preferably adjustable in height. In operation chickens are placed in the entryway, moved by suction through the fowl conduit to a receiver whereupon they pass downward through the airlock and exit through the discharge device. The height of the chicken discharge is adjustable by means of the tower so that chickens can be discharged directly into empty coops previously placed on a vehicle or at any desired elevation.

In another preferred specific embodiment, (2), of the conveying system of this invention, the elements included are similar to these described, supra, with the exception of the means for holding the receiver and the discharge device. The discharge device of this preferred specific embodiment has a plurality of bucket members forming a vertical extension of the discharge spout, being vertically adjustable. The means of holding the receiver in this preferred specific embodiment is by supporting it on a length of the fowl conduit extending from the ground level and mounted with the frame. The length of fowl conduit supporting the receiver is preferably mounted with the frame in a fixed position in operation and can preferably be rotated relative the frame and mounted therewith when not in operation.

In an additional preferred specific embodiment, (3), of the conveying system of this invention, the critical components are similar to the previously described embodiments; however, this embodiment is adapted for easy loading of rack type coops. In this preferred specific embodiment the frame has an elevator to support at varying heights the receiver, airlock and discharge in conjunction with a platform on which an operator can stand. Additionally, the elevator can be mounted with the frame in a fixed position for storage purposes when the system is in transit.

One object of the conveying system of this invention is to overcome the aforementioned disadvantages of the prior art systems.

Still, one other object of the conveying system of this invention is to provide a system for rapid removal of fowl from such as the chicken house, pen or whatever to coops on a vehicle used for their transportation.

Still another object of the conveying system of this invention is to provide a system for loading chickens into coops and onboard a vehicle whereby the chickens are not physically injured in a manner which can render them unacceptable for food marketing purposes.

Yet another object of the conveying system of this invention is to provide a system for chicken transportation which is economical in terms of time and labor required to move a large quantity of chickens from a specific place to coops onboard a vehicle and also economical in that the system is easily portable between the locations where chickens are to be moved from.

One further object of the conveying system of this invention is to provide a means of moving chickens which is simple to operate and requires a minimum number of people to operate.

Various other objects, advantages, and features of the invention will become apparent to those skilled in the art from the following discussion, taken in conjunction with the accompanying drawings, in which.

The following is a discussion and description of preferred specific embodiments of the new conveying system of this invention, such being made with reference to the drawings, whereupon the same reference numerals are used to indicate the same or similar parts and/or structure. It is to be understood that such discussion and description is not to unduly limit the scope of the invention.

Figures 1, 3:
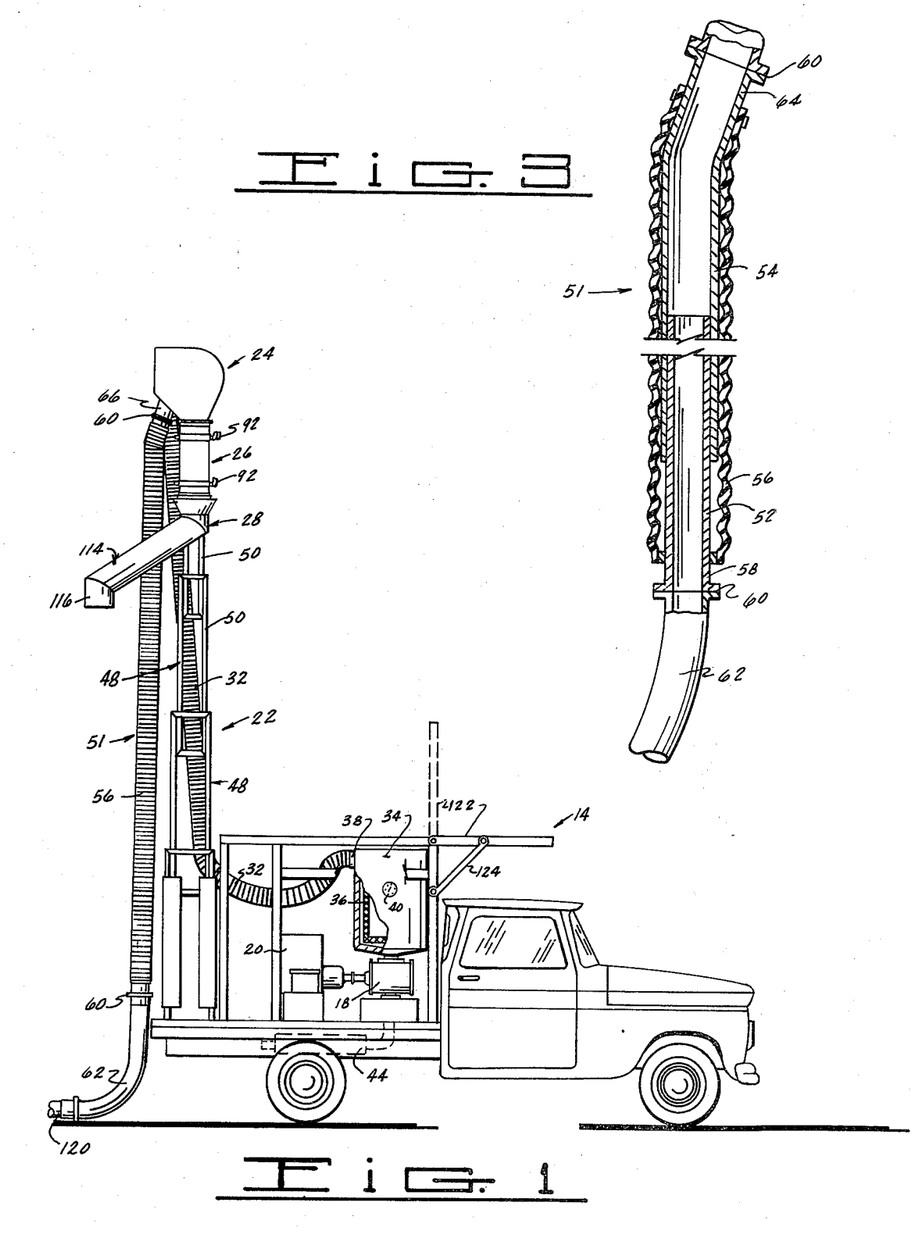
FIG. 1 is a side elevation view of one preferred specific embodiment of this invention mounted with a truck and having a vertically extendable tower in extended position.
FIG. 3 is a shortened partial cross-sectional view of the extendable fowl conduit connected with the receiver.
Figures 2, 7, 8:
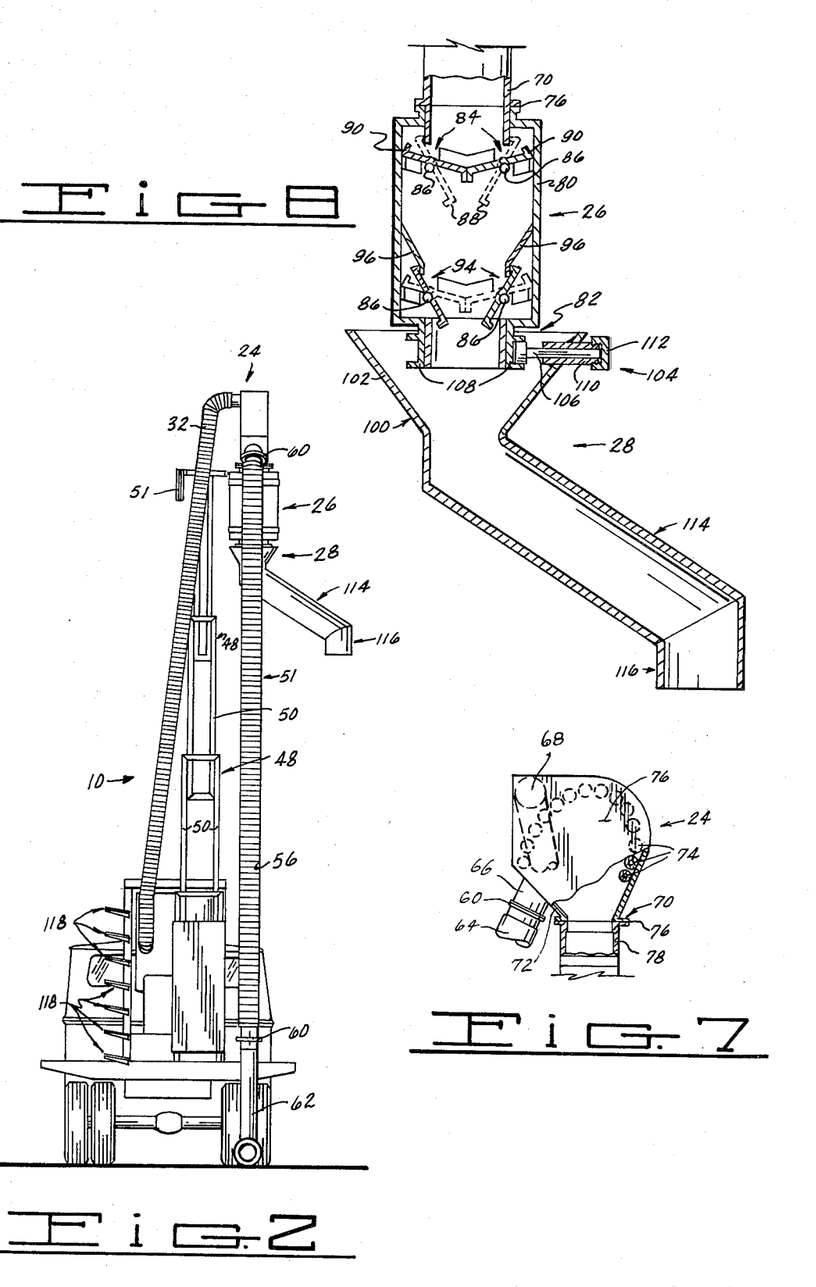
FIG. 2 is a rear elevational view of the system shown in FIG. 1.
FIG. 7 is a partial cross-sectional side elevation view of the receiver mounted with the airlock and fowl conduit.
FIG. 8 is a partial cross-sectional side elevation view of the airlock and discharge device with swivel and discharge spout.

Referring to the drawings in detail and in particular to FIGS. 1 and 2, one (1) preferred specific embodiment of the conveying system of this invention is shown therein. The conveying system of this preferred specific embodiment, generally indicated at 10, is shown mounted on the bed of a truck 12. The truck 12 supports the frame, generally indicated at 14, enclosing the filter 16, blower 18, powering device 20, and tower 22. The receiver 24, airlock 26 and discharge device 28 are shown in FIGS. 1 and 2 mounted on the tower 22 and connected with the fowl conduit 30 and suction conduit 32.

The filter 16, blower 18, powering device 20, receiver 24 and airlock 26 are common elements to the preferred specific embodiments herein described and will be described before the preferred specific embodiments. The powering device 20 is preferably a small internal combustion engine; in practice a 30 to 35 horsepower air cooled engine has proven very satisfactory. It is to be understood the powering device 20 herein described as an air cooled internal combustion engine is not to unduly limit the scope of the invention; the powering device of the herein described preferred specific embodiments can also be an electric motor, turbine or other powering device. The blower 18 is preferably a positive displacement type rotary blower coupled with the powering device 20. The filter is preferably an openable cylindrical tank 34 having a removable top and perforate bag member 36 therein with a suction inlet 38 into the bag 36 equipped with a pressure relief valve 40 for safety. The filter outlet 42 is mounted with the blower 18 to pass air into same. The blower 18 is fitted with a muffler 44, similar to an automotive type muffler, mounted below the truck 12. In operation air from the receiver 24 passes into the bag 36 of the filter 16 whereupon feathers, dirt, etc., are removed to protect the blower 18 from damage.

The receiver 24 is a sealed cavity with an inlet 66 which mounts with the upper end portion 64 of the telescoping fowl conduit 51 and a suction outlet 68 which connects with the suction conduit 32; also the receiver has an outlet 70 which mounts with the airlock 26. The inlet 66 is mounted through an inclined wall 72 joining the outlet 70. In operation a chicken entering the inlet 66, preferably head first, will attempt to stand on the wall 72 and slide downward, feet first to the outlet 70. The interior of the receiver has a plurality of cylindrical shaped bumpers 74 constructed of a resilient material operable to protect from injury chickens entering the receiver 24. The bumpers 74 preferably extend transversely across the receiver 24 between the vertical sidewalls 76 and in a semi-annular shape from above the inlet 66 on one side of the cavity within the receiver 24 to the opposite side of the cavity. The bumpers 74 are spaced to pass air therebetween so the suction outlet 68 can draw air freely from the inlet 66. The suction outlet 68 is connected with the suction conduit 32 which is preferably constructed of an imperforate flexible conduit material, which can be easily stored when the tower 22 is in a lowered position. In operation the receiver 24 mounts with the airlock 26 by means of a coupling 76 which can be removed when the system is not in operation.

Figures 4, 6:
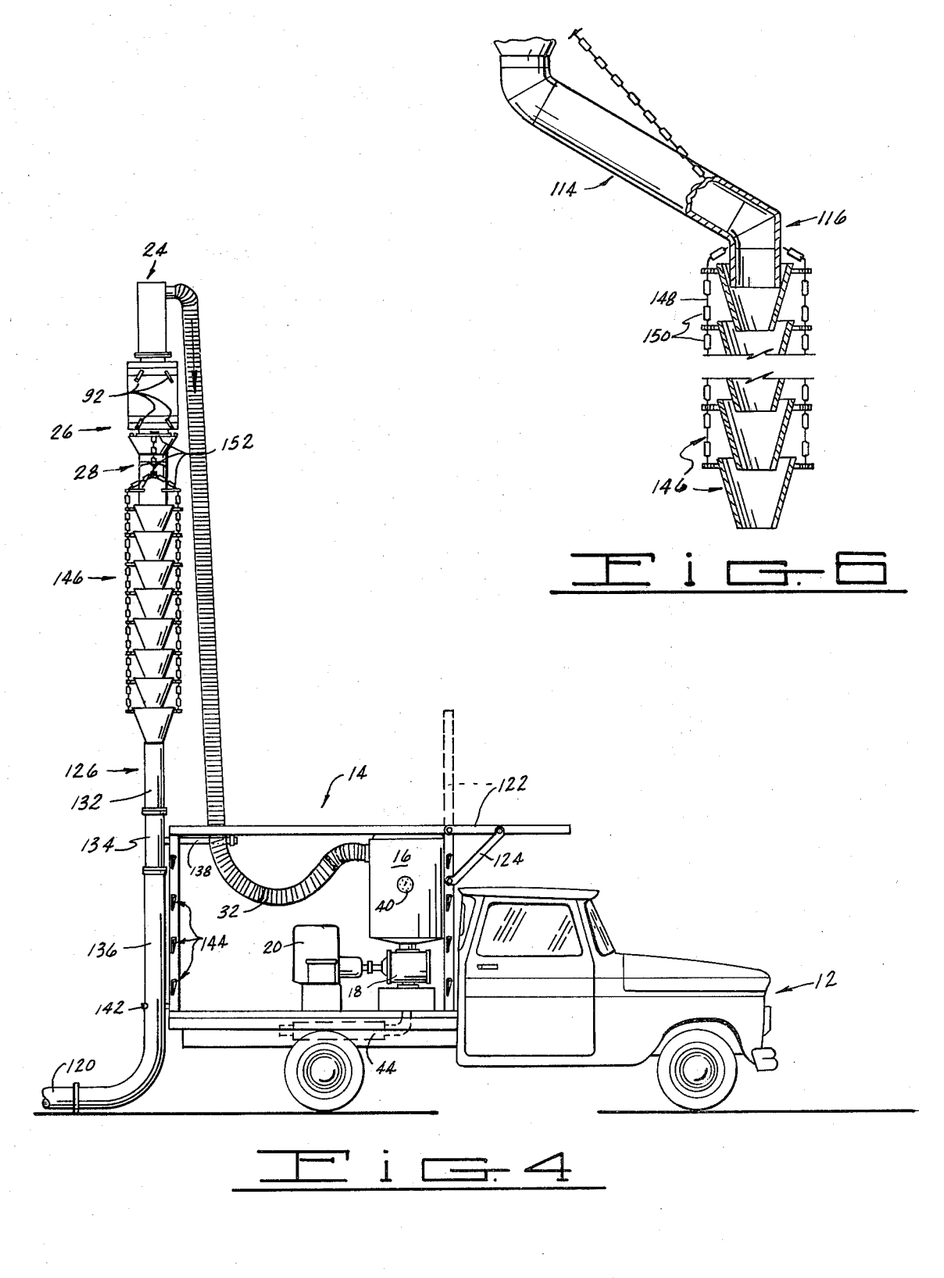
FIG. 4 is a side elevation view of another preferred specific embodiment of this invention mounted with a truck and having the receiver, airlock and discharge device supported on the fowl inlet conduit.
FIG. 6 is a shortened partial cross-sectional view of the discharge spout and buckets of the system shown in FIG. 4.

The airlock 26 defines a partitioned cavity having an inlet 78, sidewalls 80 and outlet 82. In the normally upper portion of the airlock 26 a pair of downwardly opening doors 84 extend thereacross. Individually the doors 84 are rotatably supported in the center portion thereof on a rod member 86 and have a downwardly projecting center edge 88 and upwardly projecting outer edge 90. When in the closed position the doors 84 meet at the center edges 86 in a downwardly pointed apex and the outer edges 90 contact the side 80 of the airlock 26. The doors 84 are held closed and in a balanced condition by counterweights 92 attached with the rods 86 and positioned on the outside of the airlock 26 as can be seen in FIGS. 1 and 4. The balanced condition of the doors 84 provides for their tendency to close automatically when the system is not in operation and provides for their easy opening when the system is in operation and suction is holding them tightly closed. The doors 84 are prevented from opening over center by the edges 90 contacting an extended part of the inlet 78. When the system is operable and the doors 84 are held closed then only a small amount of pressure is necessary near the center edges 86 to open them. Another set of doors 94 are positioned in the lower portion of the airlock 26, being substantially the same as the other doors 84, opening against the stop members 96 they function similarly. In operation a suction is created in the airlock 26, holding both sets of doors 84 and 96 closed; a chicken enters the airlock inlet 78 from the receiver 24 and opens the upper set of doors 84 and falls into the cavity in the center portion of the airlock 26. The sets of doors 84 and 94 are sufficiently spaced apart that when a chicken falls through the upper doors 84 they will close before it passes through the lower set of doors 94 thereby maintaining a suction seal. When the chicken is in the cavity and the upper doors 84 close the lower doors 94 will open easily allowing the chicken to pass through the airlock outlet 82. A chicken leaving the airlock outlet 82 passes into the discharge device 28.

In this the first described preferred specific embodiment, (1), the tower 22 preferably has a plurality of telescoping segments mounted on the rear portion of the frame 14 as shown generally in FIGS. 1 and 2. The tower segments are elongated rectangular frame shaped members, indicated at 48, with a square planform and elongated sides. The corner members 50 of the tower segments are adjacent the corner members 50 of the adjacent tower segments and have rollers, not shown in the figures, mounted therewith to allow easy movement of the tower segments along one another. The tower 22 is raised and lowered by means of a winch and cable apparatus (not shown in the drawings) but operable to raise the tower 22 to its extended height and maintain it at that level or any level therebelow. In operation the receiver 24, airlock 26 and discharge 28 are mounted with one side of the tower 22 and a counterweight 51 is suspended from the other side. In conjunction with the tower 22 telescoping movement, the fowl conduit 51 preferably moves with the tower 22. The telescoping segment of the fowl conduit 30 is shown in detail in FIG. 3. The conduit 30 has an inner sliding member 52 and an outer sliding member 54 which slide in contact with one another as the tower 22 moves up and down, providing a passageway for the chicken. A bellows 56 is connected with the upper end portion of the outer sliding member 54 and the lower end portion of the inner sliding member 52. The bellows 56 is preferably an impervious flexible conduit sealed at the ends to prevent entry of air into the fowl conduit 30 when in operation. The lower end portion 58 of the telescoping fowl conduit 51 is mounted with the frame 14 and has a coupling 60 thereon to join with a curved fowl conduit portion 62, also the upper end portion 64 of the telescoping fowl conduit 51 has a coupling 60 to mount it with the receiver 24.

The discharge device 28 of this preferred specific embodiment is somewhat similar to that for the other herein described preferred specific embodiments and is shown specifically in detail in FIG. 8. The upper portion of the discharge device 28 is a swivel joint 100 and has a conical shaped wall 102 adapted to rotatably mount with the airlock outlet 82. The swivel joint 100 has preferably three (3) support members 104 extending through the wall 102 with a rod member 106 contacting a grooved portion 108 of the outlet 82. The rod member extends through the wall 102 in a flanged portion 110 having a removable cap 112. In operation the three support members 104 hold the discharge device 28 in position to rotate freely and for storage, cleaning and inspection purposes they provide an easy means to remove the discharge device. Removal of the cap 112 will allow the rod member to slide radially outward thus provide for easy removal of the device 28. Below the swivel joint 100 is a spout conduit 114 consisting of a circular conduit extending downward and to the side of the airlock 26 with a downwardly oriented end portion 116.

The frame 14 in addition to supporting the tower 22, motor 20, filter 16 and blower 18 has a rack system, indicated at 118, to hold sections of the extended fowl conduit 120 which mounts with the curved fowl conduit 62 and connects with the chicken house, pen or whatever. The extended conduit 120 preferably has short segments with quick disconnect type couplings thereon adapted to easily be assembled and disassembled and stored on the rack system 118. On the forward portion of the frame 14 an adjustable floor member 122 is mounted to be positioned vertically or horizontally and supported by a brace member 124. This floor member 122 acts as an elevated platform for a person to stand on while loading a vehicle with coops or arranging them; it is placed on the frame 14 as a matter of convenience only.

Figure 5:
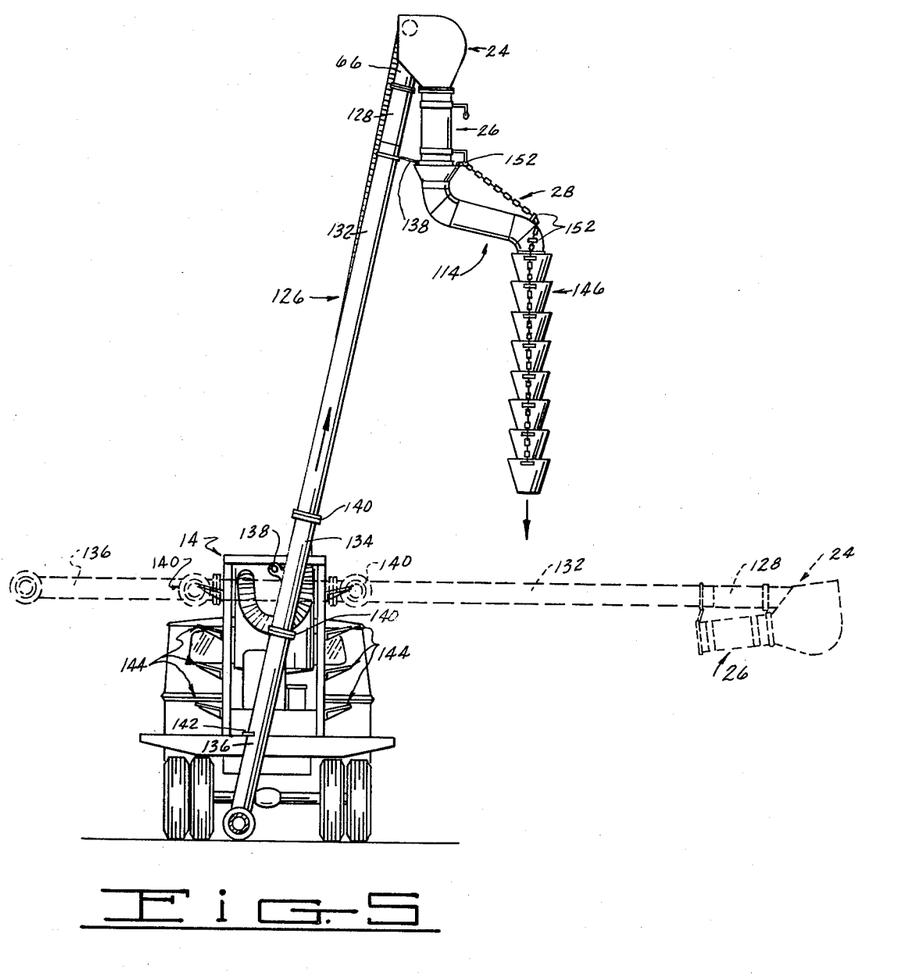
FIG. 5 is a rear elevational view of the system shown in FIG. 4.
Figure 10A:
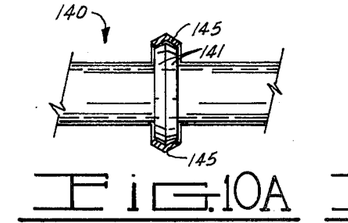
FIGS. 10A, 10B and 10C are elevational views of the hinged conduit joints of the second preferred specific embodiment, showing the conduit in the connected position, and in the ninety (90) degree rotated position, and in the fully rotated position with the ring clamp, respectively.
Figures 10B, 10C:
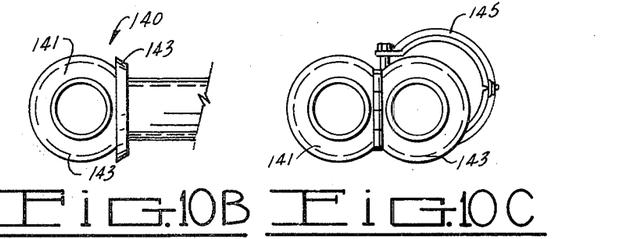

Another preferred specific embodiment, (2), of the conveying system is generally shown in FIGS. 4 and 5. This second described preferred specific embodiment includes many of the same components as the first described embodiment, namely, the frame 14 in its basic structure, filter 16, blower 18, motor 20, suction conduit 32, receive 24, airlock 26 and discharge device 28 with spout 114. The receiver 24 joins and is supported by a supporting conduit, generally indicated at 126, which has a separable upper end portion 128 mounted with the receiver inlet 66 and supported by a brace member 130 with the airlock 26. The supporting conduit 126 has an upper portion 132 with an upper end portion 128, a rotatably mounted center portion 134 and a curved lower portion 136. The center conduit portion 134 is mounted with a shaft 138 rotatably mounted with the frame 14 operable to rotate the supporting conduit 126 and support same with the receiver 24, airlock 26 and discharge device 28 thereon in operation. The center conduit portion 134 joins the end portions 132 and 136 with Vee type hinge couplings 140, shown in detail in FIGS. 10A, 10B and 10C. The coupling 140 has a flange 141 with a V-shaped perimeter 143 and a hinge between the flanges operable to rotate opening the coupling. When in operation the coupling 140 is held closed by a clamp 145 around its perimeter. When the supporting conduit is stored the couplings 140 let the conduit ends 132 and 136 rotate to mount with the frame 14 as shown in the dotted portion of FIG. 5. The lower end portion 136 of the supporting conduit 126 is held by a brace member 142 substantially rigid with the frame 14 to support the supporting conduit 126 when the system is in operation. Also, the frame 14 has a rack system 144 operable to store the extended fowl conduit 120 and receiver 24, airlock 26 and discharge device 28 when not in use.

The discharge device 28 of this preferred specific embodiment is substantially the same as the first described embodiment and it has a plurality of buckets 146 depending from the spout 114 over the downwardly pointed end 116. The buckets 146 are held by a cord 148 with a plurality of cord retractors 150 operable to maintain the buckets 146 in a spaced relation and in a fixed position but variable in height. The cord 148 is suspended from hangers 152 on the spout 114 and airlock 26. Individually the buckets 146 have the outer shape of a frustum of a cone with an open interior and are preferably supported with the smaller diameter end downward and within the interior portion of the bucket below, as shown in FIG. 6.

In operating this preferred specific embodiment, (2), of the conveying system functions similarly to the first described preferred specific embodiment except the height at which chickens are finally discharged from the apparatus is determined by the level of the buckets. When the conveying system of this preferred specific embodiment is not in operation the supporting conduit 126 can be rotated to lower the supporting conduit 126 whereupon the receiver 24, airlock 26 and discharge 28 with the upper end portion 128 can be removed from the upper conduit portion 132. Additionally the upper conduit portion 132, lower conduit portion 136 and upper end portion with receiver 24 and airlock 26 attached can be mounted with the frame 14 for transport purposes.

Figures 11, 13:
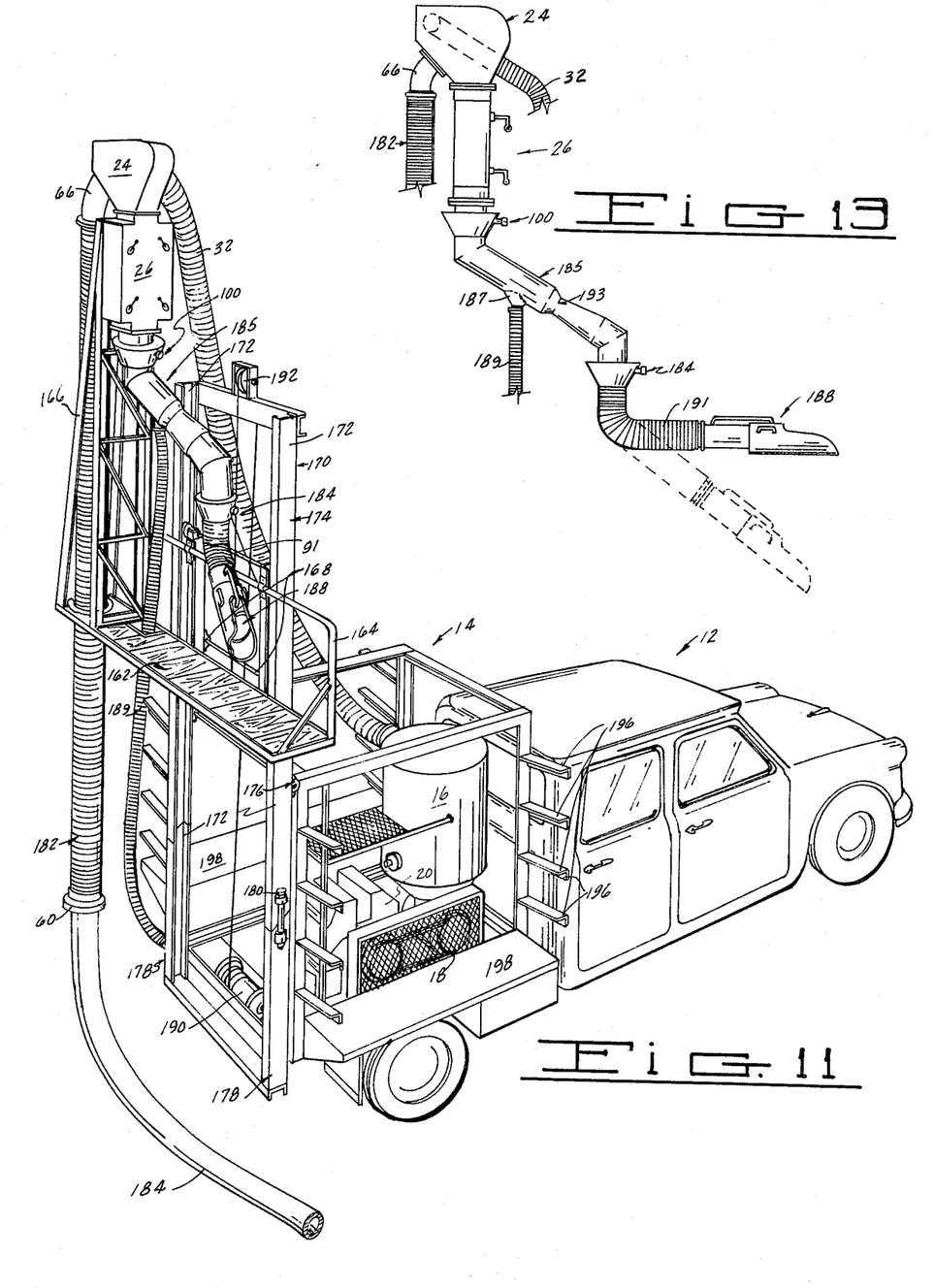
FIG. 11 is a perspective view of another preferred specific embodiment of this invention having the receiver, airlock and discharge device mounted on an elevator on the frame and having this preferred specific embodiment mounted on a track.
FIG. 13 is an elevational view of the receiver, airlock and discharge portion of the preferred specific embodiment of this invention shown in FIGS. 11 and 12.
Figure 12:
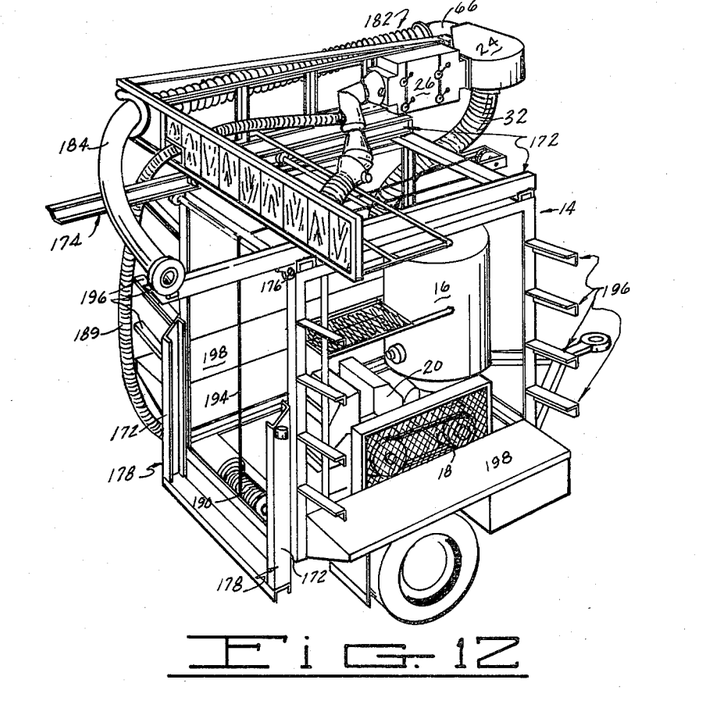
FIG. 12 is a perspective view of the preferred specific embodiment of this invention shown in FIG. 11 and mounted on a trailer.

Another preferred specific embodiment, (3), of the conveying system is generally shown in FIGS. 11 and 12. This third described preferred specific embodiment includes basically the same components as the first, (1), and second, (2), described preferred specific embodiments, namely, the frame 14 in its basic structure, filter 16, blower 18, motor 20, receiver 24, airlock 26, discharge device 28 with spout 114 and suction conduit 32. In this preferred specific embodiment, (3), the frame 14 has an elevator, indicated generally at 160, which holds the receiver 24, airlock 26 and discharge 28 and an operator. The elevator 160 is operable to move up and down with an operator thereby easily loading chickens into rack type coops or discharging them at a desired elevation.

The elevator 160 is mounted integrally with the frame 14 on the end thereof; it has a platform member 162 with a hand rail 164 and supporting structure 166 to hold the receiver 24 and airlock 26. The platform 162 is mounted on a wheeled carrier 168 which is mounted to move in a guide 170. The guide 170 is a pair of channel shaped guide members 172 mounted with the end of the frame 14 and made in two segments. The upper segment 174 of the guide members 172 is mounted with the upper edge of the frame 14 at 176 to rotate thereabout from the operating position to a storage position. The lower segment 178 of the guide members 172 is rigidly mounted with the lower end portion of the frame 14. The upper segment 174 and lower segment 178 of the guide member 172 are held in the operating position by a pin member 180 locking them operably in place at their junction.

The extendable fowl inlet conduit 182 is preferably constructed similar to the telescoping fowl conduit 51 shown in FIG. 3 and used in the herein just described embodiment. The extendable fowl conduit 182 connects the inlet 66 of the receiver 24 and a curved conduit member 184. The extendable conduit 182 is somewhat enclosed by the supporting structure 166 for the receiver 24 and airlock 26. The supporting structure 166 is positioned at the end portion of the platform 162 to facilitate greater freedom and flexibility for the discharge device 28. The discharge device 28 of this preferred specific embodiment has an upper swivel joint 100, similar to the first described embodiment, (1), a venturi conduit member 185 with auxiliary air inlet 187 connected by conduit 189 to the muffler 44 outlet, another similar joint 184 connected with the venturi conduit member 185, and a lower spout assembly 186 therefrom with a flexible conduit segment 191 and a lengthwise adjustable end portion 188. The venturi conduit 185 depends from the upper swivel joint preferably at an angle of about forty-five (45) degrees and has a venturi in the lower portion thereof. The venturi conduit 185 has a diameter slightly larger than the fowl inlet conduit 120 and 184 and the venturi has a throat 193 with diameter approximately that of the fowl inlet conduit 120 and 184. At the lower end of the venturi conduit 185 is the lower swivel joint 184 with a short angular formed conduit connecting it and the flexible conduit portion 191. Attached to the flexible conduit 191 is the length adjustable end portion 188. The end portion 188 has an inner conduit connected to the flexible conduit 191 and an outer conduit which slides over the inner conduit to extend the length of the discharge conduit. Immediately above the venturi throat 193 on the larger diameter conduit portion the auxiliary air inlet attaches the venturi conduit. In operation air which exits the blower 18 passes through the muffler 44, conduit 189, inlet 187 and into the venturi conduit 185 to exit through the adjustable end 188. When air passes through the venturi in less than a choked flow condition a low pressure area is created in the throat area. As chickens fall through the lower doors 94 of the airlock 26, upper swivel joint 100 and enter the venturi conduit they move by gravity force until they reach the venturi, henceforth they are pulled through the low pressure throat area and pushed through the remaining discharge conduit. In operation this discharge will give the chickens sufficient momentum to move them preferably four (4) to eight (8) feet past the end of the discharge. The adjustable spout end portion 188 is easily extendable by the operator and can be easily rotated at the joint 184 horizontally as necessary to discharge the chickens at the desired position. The elevator 160 is operable by means of a winch and cable apparatus, having a winch 190 mounted with the frame 14 and an upper pulley 192 mounted with the top of the guide 170 using a cable 194 to raise and lower the carrier 168 and the platform 162 with an operator thereon.

When the chicken coop conveying system of this preferred specific embodiment is not in use it can be stored as shown in FIG. 12 and easily transported. With the fowl conduit 120 disconnected the upper segment 174 of the guide 170 can be unfastened from the lower segment 178 and rotated to lay on the top of the frame 14. When the system is in this storage position, the extendable fowl conduit 182 is in a shortened position and the lower curved portion 184 is mounted with the lower end portion of the guide 172 to prevent damage. Additionally the frame 14 has a plurality of rack members, indicated at 196, to hold sections of the fowl conduit 120 which normally connects the system with the chicken house or whatever, and the frame preferably has working platforms 198 on both sides of the frame 14 to aid persons in loading the fowl conduit sections on the racks 196 and generally in using the system.

Figure 9:
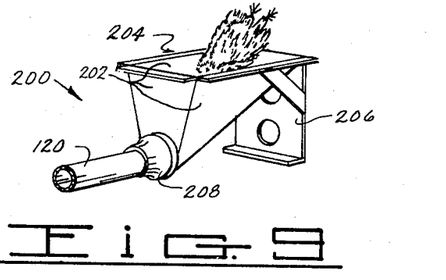
FIG. 9 is a perspective view, from the conduit end, of the entryway mounted with a segment of the fowl conduit and having a chicken in the entranceway thereof.

In addition to the previously described embodiments the conveying system of this invention a hopperlike entryway 200 is usable with all the embodiments; it is shown in FIG. 9. The hopper entryway 200 has somewhat vertical sidewalls 202 forming a funnel shaped container with an upwardly opening inlet 204 held by a support stand member 206 at one end. The sidewalls 202 slope to join a conically tapered conduit section 208 which is mountable with the fowl conduit 120. In operation chickens are placed in the inlet 204 of the hopper entryway 200 and are pulled by suction through the tapered section 208 into the fowl conduit 120. The hopper entryway 200 can be placed in the chicken house, pen or whatever or it can be placed in, on or near a vehicle carrying chickens so they can be easily placed in the inlet 204.

Figure 14:
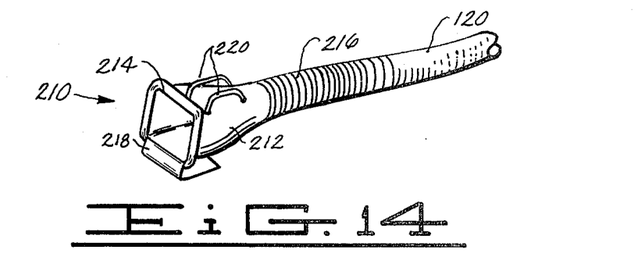
FIG. 14 is a perspective view, from the inlet end, of the portable entryway attached to a flexible conduit segment and connected to the fowl conduit.

Additionally a portable entryway 210 is also easily usable with the conveying system, it is shown in FIG. 14. The portable entryway 210 is a conical shaped structure 212 with a flared inlet 214 attachable to the fowl inlet conduit 120. One end of the conical shaped structure 212 is connected to a segment of flexible hose 216 of sufficient length to allow substantial movement of the entryway 210 relative to the fowl conduit 120. The flared inlet 214 has a curled rim portion to protect the birds entering the inlet. A stand 218 is attached to the entryway 210 to hold the conical shaped structure 212 in a substantially horizontal position. Handles 220 are attached to the top of the conical shaped structure 212 so the entryway 210 can be easily moved or carried. In operation the entryway 210 can be placed in a corner of a chicken house, pen or whatever and one person can hold the inlet and individually direct the birds into it or place them in it and another person can herd or direct additional birds to that corner. In practice it has been found that with this entryway 210 a bird standing close to the inlet 214 will be sucked into it, so the birds do not need to be individually placed in the inlet to be moved by this system. It is to be understood that either of the herein described entryways 200 and 210 can be used with any of the herein described embodiments with the choice depending upon the particular use of the system.

In all of the herein described embodiments of the conveying system it is to be understood the invention can be constructed as part of a truck or similar vehicle or alternately as part of a trailer in a manner similar to the embodiment shown in FIG. 12 or additionally they can be made a permanent installation. One obvious feature of the forms of construction of the loading system is the easy portability of the system. With either portable forms of construction, the loading system can be easily moved from one chicken house, pen or whatever to another thereby providing a more flexible use of the system. Also, it is to be understood the conveying system of this invention can be installed and maintained as a permanent structure for use in conveying live fowl where there is sufficient need for a permanent installation.

In general, operation of conveying system in any of the preferred specific embodiments set forth herein is similar. With the system set up to operate chickens are placed one at a time in the entryway 200 or 210 and suction created by the blower 18 draws them through the fowl conduit 120. Normally the one or two persons pick up chickens by hand and place them in the entryway 200. When the conveying system is used for loading chickens they reach the receiver 24, they descend through the airlock 26 and discharge 28 into the coop. Normally coops take several forms; one form is a rectangular wooden cage having an openable lid on the top thereof and normally stacked on a truck or trailer; another form is a rack type coop integral with a trailer and with two walls of coops positioned on opposite sides of the trailer and opening to the inside between the walls or to the outside, and yet another form of rack type coop extends entirely across the trailer. Any of the herein described embodiments are easily used in loading the cage type coop; however, in loading the rack type coop the third described preferred specific embodiment is preferred. When the conveying system is used for conveying chickens into a chicken house, pen or whatever the apparatus is positioned so the chickens will exit the discharge 28 into the chicken house, pen or whatever at approximately the elevation of the floor thereof. Since chickens and other types of fowl are raised or are kept in many different types of structures the specific placement of the conveying system depends on the particular housing structure. Live fowl such as chickens are raised or are kept fenced or in enclosed pens with the birds on the ground, or the pens may have an elevated mesh screen floor. Also, these live fowl are sometimes kept in an enclosed environmental structure and may have individual cages within the structure or they may be free to move about. These different structures for housing and keeping live fowl depend on the purpose for which the birds are maintained, egg production, consumption, breeding, etc. The geographical location and climatic conditions are also a factor involved with the different housing structures. It is obvious from the differences in the live fowl housing structures and means to keep live fowl that the conveying system of this invention easily adapts to use with them due to the variable geometry of the structure.

In previous use and operation of the conveying system of this invention, it has been found preferable to use one size conduit in systems for handling the broiler class of chicken which is normally commercially raised for sale in grocery stores as fryers and weigh on the average approximately three (3) pounds before processing. A larger size conduit is preferred in conveying systems designed for handling the larger egg laying class of chicken which have an average weight of four (4) pounds after having served as egg laying hens for a period of time. In steady state operation of the system, regular inputs of chickens, the system of the third (3) preferred specific embodiment has been found to transport chickens approximately two hundred (200) feet in about fifteen (15) seconds.

In the use and operation of the conveying system of this invention it is seen that same provides a rapid and safe method and means to remove chickens or similar live fowl from a house, pen or whatever and load them in coops to be transported or to move them from transporting vehicle to a house, pen or whatever. Also, it is seen the loading system itself is easily transportable.

As will be apparent from the foregoing description of the applicant's conveying system, a safe, rapid and hand labor saving system has been provided to convey live fowl. The conveying system is economical in that a fewer number of people are required to load a large quantity of chickens than by previous methods and the chickens can be loaded in a shorter time and with less chance of injury. Additionally the conveying system is not restricted to use at one particular location however it can be a permanent installation.

While the invention has been described in conjunction with preferred specific embodiments thereof, it will be understood that this description is intended to illustrate and not limit the scope of the invention, which is defined by the following claims.

I claim:

1. A conveying system for the transport of live fowl comprising:
   (a) a receiver chamber mounted on a frame, said receiver chamber including a housing having a fowl inlet and a fowl outlet for live fowl, a pressure differential outlet for air generally positioned laterally with respect to said fowl inlet for inhibiting additional forward progression of said live fowl from said fowl inlet, and a partition for cushioning and directing said live fowl towards said fowl outlet comprising a plurality of resilient cylindrical bumper members transversely attached within said housing to allow the passage of said air therebetween and to essentially enclose said fowl inlet and said fowl outlet and separate same from said pressure differential outlet while said air is being passed thereto;
   (b) an airlock connected to said receiver outlet, said airlock comprising a housing including a fowl discharge outlet and at least two door members opening sequentially during conveyance of said live fowl through said airlock;
   (c) a fowl conduit having an inlet for said live fowl and an outlet attached to said fowl inlet of said receiver chamber; and
   (d) means connected to said receiver chamber for creating a pressure differential between said fowl conduit inlet and said receiver chamber in order to move said live fowl to said receiver chamber for discharge through said door members of said airlock.

2. The conveying system of claim 1, wherein said receiver housing comprises a lower portion defining said fowl outlet, an inclined wall attaching to said lower portion wherein said fowl inlet is situated, said inclined wall having an inclination sufficient to prevent said live fowl from standing thereon, and at least one sidewall attaching to said inclined wall, said pressure differential outlet for air being positioned on said sidewall.

3. The conveying system of claim 1, wherein said airlock comprises said housing having said door members spaced and cooperating to form a chamber therebetween.

4. The conveying system of claim 3, wherein said spaced door members define an upper cavity having an inlet connected to said fowl outlet of said receiver housing, and a lower cavity having an outlet defining said fowl discharge outlet, said door members are pivotally supported in said airlock on support members which rotatably connect to the sides of said airlock, and said support members include counterweights thereon to bias said door members to a closed position.

5. The conveying system of claim 4, wherein said housing of said airlock comprises a pair of protruding members attached to an inlet of an upper cavity and extending therein, a pair of stop members connected within the chamber to the interior walls of said housing of said airlock, an upper pair of said door members each pivotally lodging on one of said support members in the upper part of said housing of said airlock to define the bottom of an upper cavity and the top of said chamber, a lower pair of said door members each pivotally lodging on one of said support members in the lower part of said housing of said airlock to define the bottom of said chamber and the top of a lower cavity, said door members being pivoted by said support members to such that said upper pair of said door members open against said protruding members and said lower pair of said door members open against said stop members, and sealing means on said door members to substantially seal said airlock when said doors are in a closed position.

6. The conveying system of claim 1, additionally including a means connected to said airlock for discharging said live fowl from said airlock.

7. The conveying system of claim 6, wherein said means for discharging said live fowl from said airlock comprises a discharge conduit having an upper portion and a lower portion, said upper portion including a structure defining a venturi, an upper swivel joint rotatably connected to said airlock, an auxiliary air inlet connected to said means for creating a pressure differential and situated between said venturi and said upper swivel joint, said lower portion including a structure defining a lower swivel joint connected to the lower end portion of said venturi, a flexible conduit member connected to said lower swivel joint, and a lengthwise adjustable discharge spout attached to said flexible conduit, said spout having an outer conduit member slidably mounted on an inner conduit member operable to change the length of said discharge spout.

8. The conveying system of claim 7 wherein said frame includes an elevator comprising a guide, a platform movably mounted on said guide, said platform including a supporting structure for supporting said receiver chamber, said airlock, said means for discharging, and said fowl conduit in the operative position of said system.

9. The conveying system of claim 8, wherein said guide has a lower section fixedly mounted to said frame, and an upper section pivotally mounted to a stop portion of said frame for rotation of said upper section and for securing of said upper section to the top portion of said frame, with said platform, said receiver chamber, said airlock, said means for discharging, and said fowl conduit positioned for storage on said top portion of said frame.

10. A conveying system for the transport of live fowl comprising:
(a) a receiver chamber mounted on a frame, said receiver chamber including a housing having a fowl inlet and a fowl outlet for live fowl, means situated within said receiver chamber for cushioning and directing said live fowl towards said fowl outlet;
(b) an airlock connected to said receiver outlet, said airlock comprising a housing including a fowl discharge outlet and at least two door members opening sequentially during conveyance of said live fowl through said airlock;
(c) a fowl conduit having an inlet for said live fowl and an outlet attached to said fowl inlet of said receiver chamber;
(d) means connected to said receiver chamber for creating a pressure differential between said fowl conduit inlet and said receiver chamber in order to move said live fowl to said receiver chamber for discharge through said door members of said airlock; and
(e) means for discharging said live fowl from said airlock comprising a discharge conduit having an upper portion and a lower portion, said upper portion including a structure defining a venturi, an upper swivel joint rotatably connected to said airlock, an auxiliary air inlet connected to said means for creating a pressure differential and situated between said venturi and said upper swivel joint, said lower portion including a structure defining a lower swivel joint connected to the lower end portion of said venturi, a flexible conduit member connected to said lower swivel joint, and a lengthwise adjustable discharge spout attached to said flexible conduit, said spout having an outer conduit member slidably mounted on an inner conduit member operable to change the length of said discharge spout.

11. The conveying system of claim 10, wherein said frame includes an elevator comprising a guide, a platform movably mounted on said guide, said platform including a supporting structure for supporting said receiver chamber, said airlock, said means for discharging, and said fowl conduit in the operative position of said system.

12. The conveying system of claim 11, wherein said guide has a lower section fixedly mounted to said frame, and an upper section pivotally mounted to a stop portion of said frame for rotation of said upper section and for securing of said upper section to the top portion of said frame, with said platform, said receiver chamber, said airlock, said means for discharging, and said fowl conduit positioned for storage on said top portion of said frame.

13. A conveying system for the transport of live fowl comprising:
(a) a frame;
(b) a receiving chamber mounted on said frame, said receiving chamber including a housing having an inlet and an outlet for live fowl, with both unobstructively communicating with an open space in said housing large relative said inlet, said outlet being in a lower portion of said housing and said inlet thereabove;

(c) an airlock connected to said receiving chamber fowl outlet, said airlock comprising a housing including a fowl discharge outlet and at least two doors therein opening sequentially during passage of said live fowl through said airlock, said doors being spaced apart sufficiently to receive therebetween said live fowl and each of said doors having a door member pivotally mounted near its center by a pivot attached thereto and mounted in said receiving chamber, each of said door members having greater area on one side of said pivot than on the other and said doors in operation normally being closed by the combined force of gravity and air pressure force exerted on said doors;

(d) a fowl conduit having an inlet for said live fowl and an outlet attached to said fowl inlet of said receiving chamber;

(e) means connected to said receiving chamber for creating a pressure differential between said fowl conduit inlet and said receiving chamber, and a pressure in operation in said receiving chamber less than atmospheric pressure in order to move said live fowl to said receiving chamber for passage through said airlock; and (f) means mounted and positioned in said housing and of size to direct a live fowl towards said fowl outlet and to prevent a live fowl from leaving said receiving chamber via said means connected thereto for creating a pressure differential;

said conveying system in operation with the pressure within said receiving chamber being less than atmospheric having said doors normally closed under the combined force of gravity and force exerted by the pressure differential between the atmospheric and the inside of said receiving chamber and in operation of said conveying system each of said doors is closed before the other of said doors is open and openable under the force exerted thereon by the weight of one or more live fowls to pass said live fowl therethrough.

14. The conveying system of claim 13, wherein said housing comprises a lower portion defining said outlet for live fowl, an inclined wall attaching to said lower portion wherein said fowl inlet is situated, said inclined wall having an inclination sufficient to prevent said live fowl from standing thereon, and at least one sidewall attaching to said inclined wall, said means for creating a pressure differential connected on said sidewall.

15. The conveying system of claim 13, wherein said door members are supported in said airlock on support members which rotatably connect to the sides of said airlock, and said support members include counterweights thereon to bias said door members to a closed position.

16. The conveying system of claim 13, wherein said housing of said airlock comprises a pair of protruding members attached to an inlet of an upper cavity and extending therein, a pair of stop members connected within the chamber to the interior walls of said housing of said airlock, an upper pair of said door members each pivotally lodging on one of said support members in the upper part of said housing of said airlock to define the bottom of an upper cavity and the top of said chamber, a lower pair of said door members each pivotally lodging on one side of said support members in the lower part of said housing of said airlock to define the bottom of said chamber and the top of a lower cavity, said door members being pivoted by said support member to such that said upper pair of said door members open against said protruding members and said lower pair of said door members open against said stop members, and sealing means on said door members to substantially seal said airlock when said doors are in a closed position.

17. A conveying system for live fowl comprising:

(a) a chamber for receiving a live fowl mounted on a frame and having a relatively small inlet and an outlet for the conveyed fowl positioned below said chamber;

(b) means connected to said chamber for creating a pressure differential between said inlet and chamber;

(c) a conduit connected to the chamber inlet for moving the conveyed fowl into said chamber;

(d) an airlock and discharge means connected to the chamber outlet and adapted to pass the conveyed fowl therethrough, said airlock normally being closed to the passage of air and conveyed fowl;

(e) said chamber inlet being positioned in a wall inclined to the vertical adjacent said chamber outlet, said inclined wall having an inclination sufficient to prevent the fowl from standing thereon; and (f) protecting means mounted within said chamber to protect the fowl from injury during passage through said chamber, said means for creating a pressure differential being connected to said chamber on the side of said protecting means opposite the inlet and outlet and in a place whereby in operation a live fowl cannot exit said chamber via said means for creating a pressure differential.

18. A conveying system for the transport of live fowl comprising:

(a) a frame;

(b) a receiving chamber mounted on said frame, said receiving chamber including a housing having an inlet and an outlet for live fowl, both unobstructively communicating with an open space in said housing large relative said inlet, said outlet being in a lower portion of said housing, and said inlet thereabove;

(c) an airlock connected to said receiving chamber fowl outlet, said airlock comprising a housing including a fowl discharge outlet and at least two doors therein opening sequentially during passage of said live fowl through said airlock, said doors being spaced apart sufficiently to receive therebetween said live fowl and each of said doors having a door member pivotally mounted near its center by a pivot attached thereto and mounted in said receiving chamber, each of said door members having a greater area on one side of said pivot than on the other and said doors in operation normally being closed by the combined force of gravity and air pressure force exerted on said doors;

(d) a fowl conduit having an inlet for said live fowl and an outlet attached to said fowl inlet of said receiving chamber;

(e) means connected to said receiving chamber for creating a pressure differential between said fowl conduit inlet and said receiving chamber, and a pressure in operation in said receiving chamber less than atmospheric pressure in order to move said live fowl to said receiving chamber for passage through said airlock; and (f) protecting means mounted within said housing to protect the fowl from injury during passage through said receiving chamber, and to prevent said fowl from leaving said receiving chamber via said means connected thereto to create a differential pressure, said means for creating a pressure differential being connected to said receiving chamber on the side of said protecting means opposite said inlet and outlet for live fowl, said conveying system in operation with the pressure within said receiving chamber being less than atmospheric having said doors normally closed under the combined force of gravity and force exerted by the pressure differential between the atmosphere and the inside of said receiving chamber, and in operation of said conveying system each of said doors is closed before the other of said doors is opened and openable under the force exerted thereon by the weight of one or more live fowls to pass said live fowl therethrough.

* * * * *